US012609366B2

(12) United States Patent
Abe et al.

(10) Patent No.: US 12,609,366 B2
(45) Date of Patent: Apr. 21, 2026

(54) BATTERY MODULE

(71) Applicant: PRIME PLANET ENERGY & SOLUTIONS, INC., Tokyo (JP)

(72) Inventors: Kosyo Abe, Himeji (JP); Takahide Takeda, Himeji (JP); Yasushi Tsuchida, Nisshin (JP); Keiichiro Kobayashi, Nisshin (JP); Makoto Ochi, Myouzai-gun (JP); Mio Takeno, Miki (JP); Masaki Koike, Nagoya (JP); Koji Watanabe, Okazaki (JP); Yuzo Suzuki, Kariya (JP); Seiichi Sakuramoto, Kobe (JP); Yasuo Ikeda, Toyota (JP); Kosuke Iwase, Konan (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 636 days.

(21) Appl. No.: 18/053,091

(22) Filed: Nov. 7, 2022

(65) Prior Publication Data

US 2023/0155197 A1 May 18, 2023

(30) Foreign Application Priority Data

Nov. 17, 2021 (JP) ................................. 2021-187139

(51) Int. Cl.
| | |
|---|---|
| *H01M 10/48* | (2006.01) |
| *H01M 10/04* | (2006.01) |
| *H01M 10/0525* | (2010.01) |
| *H01M 50/507* | (2021.01) |

(52) U.S. Cl.
CPC ..... *H01M 10/482* (2013.01); *H01M 10/0445* (2013.01); *H01M 10/0525* (2013.01); *H01M 50/507* (2021.01)

(58) Field of Classification Search
CPC ........... H01M 10/482; H01M 10/0445; H01M 50/507
See application file for complete search history.

(56) References Cited

U.S. PATENT DOCUMENTS

| | | | |
|---|---|---|---|
| 10,761,142 B2 | 9/2020 | Ota et al. | |
| 10,903,470 B2 | 1/2021 | Bae et al. | |
| 2012/0328920 A1 | 12/2012 | Takase et al. | |
| 2014/0368158 A1 | 12/2014 | Vu et al. | |
| 2016/0181604 A1* | 6/2016 | Son ..................... | H01M 10/425 |
| | | | 429/90 |

(Continued)

FOREIGN PATENT DOCUMENTS

| | | |
|---|---|---|
| CN | 203746993 U | 7/2014 |
| CN | 107871839 A | 4/2018 |

(Continued)

*Primary Examiner* — Christopher P Domone
(74) *Attorney, Agent, or Firm* — Finnegan, Henderson, Farabow, Garrett & Dunner LLP

(57) ABSTRACT

A battery module includes: a plurality of battery cells stacked in a predetermined direction and electrically connected together; a plurality of bus bars that electrically connect the plurality of battery cells together; and a plurality of voltage detection wires each connected to one set of two or more battery cells electrically connected together. According to the battery module, the number of the voltage detection wires is reduced, thereby attaining reduced sizes of the bus bars, productivity improved by improved workability, and reduced cost.

5 Claims, 11 Drawing Sheets

(56)         References Cited

U.S. PATENT DOCUMENTS

| | | |
|---|---|---|
| 2016/0248128 A1 | 8/2016 | Mukasa et al. |
| 2016/0308256 A1 | 10/2016 | Huang et al. |
| 2018/0026321 A1 | 1/2018 | Rhodes et al. |
| 2018/0088179 A1* | 3/2018 | Ota ........................ H05K 1/118 |
| 2018/0108898 A1* | 4/2018 | Shoji .................. H01M 10/425 |
| 2018/0145300 A1 | 5/2018 | Okazaki |
| 2018/0145301 A1 | 5/2018 | Okazaki |
| 2018/0145302 A1 | 5/2018 | Okazaki |
| 2020/0058917 A1 | 2/2020 | Sato et al. |
| 2020/0365865 A1 | 11/2020 | Yasuda et al. |

FOREIGN PATENT DOCUMENTS

| | | |
|---|---|---|
| CN | 110754006 A | 2/2020 |
| CN | 111527625 A | 8/2020 |
| JP | 2010-114025 A | 5/2010 |
| JP | 2010-225449 A | 10/2010 |
| JP | 2011-210711 A | 10/2011 |
| JP | 2015-508552 A | 3/2015 |
| JP | 2015-088426 A | 5/2015 |
| JP | 2017-502471 A | 1/2017 |
| JP | 2018-081876 A | 5/2018 |
| JP | 2018-081877 A | 5/2018 |
| JP | 2018-081878 A | 5/2018 |
| WO | WO 2011/111676 A1 | 9/2011 |

* cited by examiner

BATTERY MODULE

This nonprovisional application is based on Japanese Patent Application No. 2021-187139 tiled on Nov. 17, 2021, with die Japan Patent Office, the entire contents of which are hereby incorporated by reference.

BACKGROUND OF THE INVENTION

Field of the Invention

The present technology relates to a battery module.

Description of the Background Art

In a battery module, bus bars for connecting cells are provided on both sides beside two rows of electrodes, and voltage detection wires for voltage detection are provided on these connection members. Such a structure is disclosed, for example, in Japanese Patent Laying-Open No. 2015-88426.

SUMMARY OF THE INVENTION

In each of regions in which the connection members (bus bars) are provided, the voltage detection wires occupy a large region, thus presenting a problem in attaining reduced space. Further, the number of the voltage detection wires is increased in proportion to the number of cells, so that the number of connection points for disposing the voltage detection wires on the cells is also increased, thus resulting in a complicated connecting operation.

It is an object of the present technology to provide a battery module so as to reduce the number of voltage detection wires to attain space saving (downsizing) for connection member (bus bar) portions, productivity improved by improved workability, and reduced cost.

A battery module according to the present technology includes: a plurality of battery cells stacked in a predetermined direction and electrically connected together, a plurality of bus bars that electrically connect the plurality of battery cells together; and a plurality of voltage detection wires each connected to one set of two or more battery cells electrically connected together.

The foregoing and other objects, features, aspects and advantages of the present invention become more apparent from the following detailed description of the present invention when taken in conjunction with the accompanying drawings.

BRIEF DESCRIPTION OF THE DRAWINGS

FIG. 9 is a schematic diagram showing a second connection pattern of voltage detection terminals of voltage detection wires to bus bars according to another embodiment.

FIG. 10 is a schematic diagram showing a third connection pattern of a voltage detection terminal of a voltage detection wire to a bus bar according to another embodiment.

FIG. 11 is a schematic diagram showing a fourth connection pattern of a voltage detection terminal of a voltage detection wire to a bus bar according to another embodiment.

DESCRIPTION OF THE PREFERRED EMBODIMENTS

Figure 1:
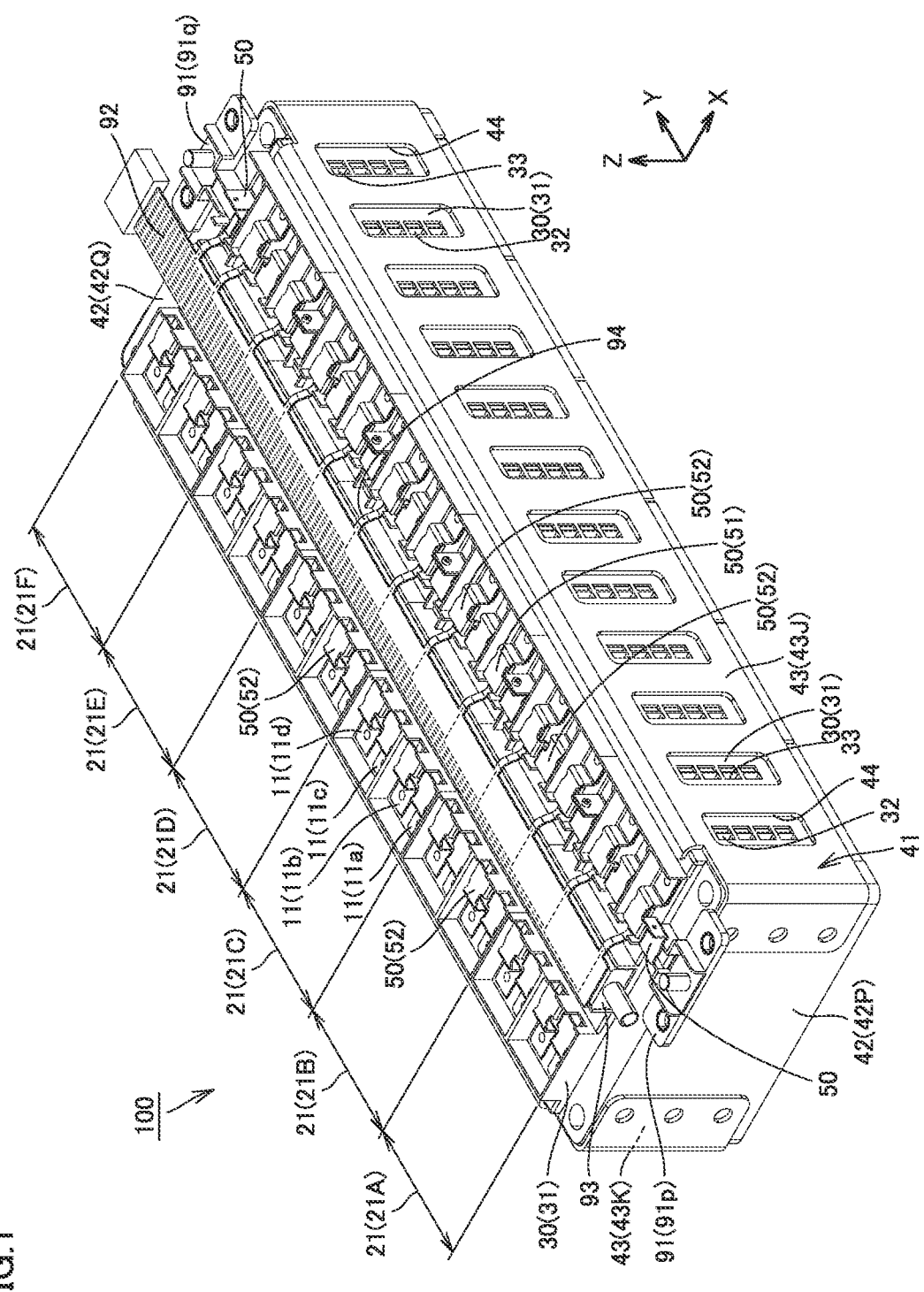
FIG. 1 is a perspective view showing a battery module according to a first embodiment.

Hereinafter, each of embodiments of the present technology will be described. The same or corresponding portions are denoted by the same reference characters, and may not be described repeatedly.

In each of the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly.

In the present specification, the terms "comprise", "include", and "have" are open-end terms. That is, when a certain configuration is included, a configuration other than the foregoing configuration may or may not be included. Further, the present technology is not limited to one that necessarily exhibits all the functions and effects stated in the present embodiment.

The battery module according to each of the embodiments is typically a lithium ion secondary battery to be mounted on a vehicle. It should be noted that in the present specification, the term "battery" is not limited to a lithium ion battery, and may include another battery such as a nickel-metal hydride battery.

First Embodiment: Battery Module 100

Figure 2:
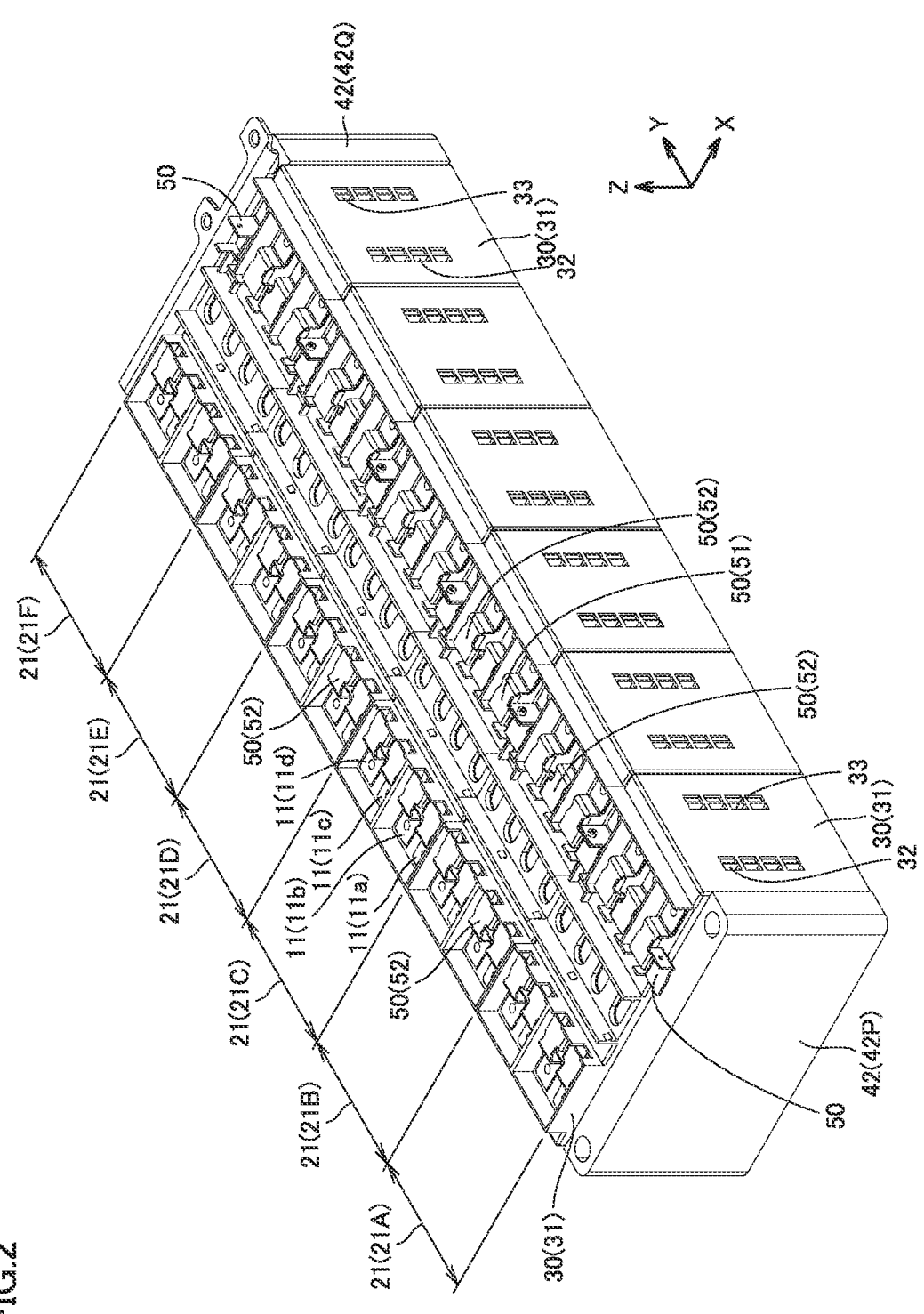
FIG. 2 is a perspective view showing an internal structure of the battery module in FIG. 1.
Figure 3:
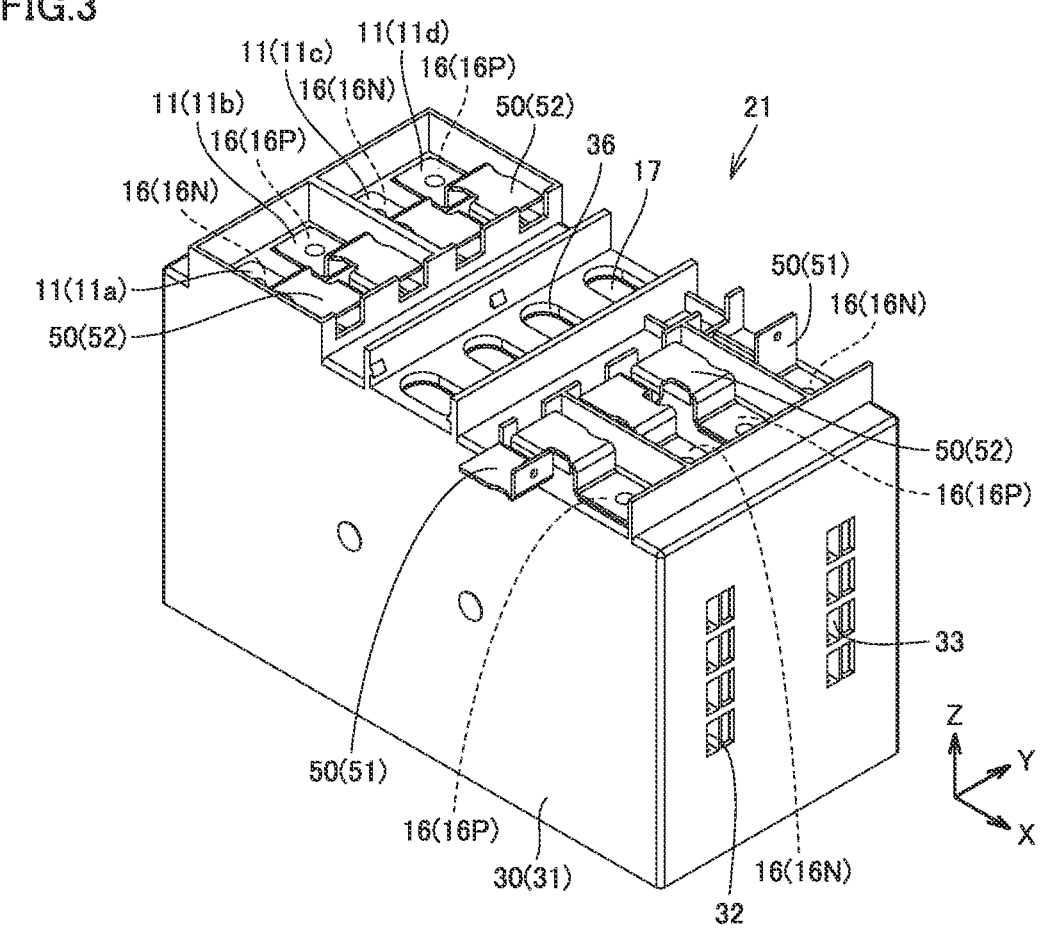
FIG. 3 is a perspective view showing a battery cell unit included in the battery module in FIG. 1.

FIG. 1 is a perspective view showing a battery module 100 according to the present embodiment. FIG. 2 is a perspective view showing an internal structure of battery module 100 in FIG. 1. FIG. 3 is a perspective view showing a battery cell unit 21 included in battery module 100 in FIG. 1.

Referring to FIGS. 1 to 3, battery module 100 is used as a power supply for driving a vehicle such as a hybrid electric vehicle (HEV), a plug-in hybrid electric vehicle (PHEV), or a battery electric vehicle (BEV).

In the present specification, for convenience of description of the structure of battery module 100, the "Y axis" represents an axis extending in parallel with a stacking direction of a plurality of below-described battery cells 11, the "X axis" represents an axis extending in a direction orthogonal to the Y axis, and the "Z axis" represents an axis extending in a direction orthogonal to the Y axis and the X axis. An obliquely rightward upward direction in the plane of sheet of FIG. 1 is "+Y axis direction", and an obliquely leftward downward direction in the plane of sheet of FIG. 1 is "−Y axis direction". An obliquely rightward downward direction in the plane of sheet of FIG. 1 is "+X axis direction" and an obliquely leftward upward direction in the plane of sheet of FIG. 1 is "−X axis direction". An upward direction in the plane of sheet of FIG. 1 is "+Z axis direction" and a downward direction in the plane of sheet of FIG. 1 is "−Z axis direction".

Typically, with regard to the form of battery module 100, the Y axis direction represents a "long-side direction", the X axis direction represents a "width direction", which serves as a short-side direction, and the Z axis direction represents a "height direction". Moreover, battery module 100 is mounted on a vehicle in such a posture that the 41 axis direction corresponds to the upward direction and the −Z axis direction corresponds to the downward direction.

An overall structure of battery module 100 will be described. As shown in FIG. 1, battery module 100 has a plurality of battery cell units 21 (21A, 21B, 21C, 21D, 21E, 21F) and a restraint member 41.

The plurality of battery cell units 21 are stacked in the Y axis direction. The plurality of battery cell units 21 are collectively held by restraint member 41. Battery cell unit 21A, battery cell unit 21B, battery cell unit 21C, battery cell unit 21D, battery cell unit 21E, and battery cell unit 21F are arranged side by side in this order from the negative side to the positive side in the Y axis direction. It should be noted that the number of battery cell units 21 included in battery module 100 is not particularly limited as long as two or more battery cell units 21 are included.

Restraint member 41 applies, to the plurality of battery cell units 21, restraint force along the Y axis direction. Restraint member 41 has a pair of end plates 42 (42P, 42Q), a pair of first restraint bands 43, and a second restraint band (not shown).

The pair of end plates 42 are disposed on both sides beside the plurality of battery cell units 21 stacked in the Y axis direction. End plate 42P is disposed to face battery cell unit 21A in the Y axis direction. End plate 42Q is disposed to face battery cell unit 21F in the Y axis direction. Each of end plates 42 is composed of a plate material having a thickness direction corresponding to the Y axis direction.

The pair of first restraint bands 43 are disposed on both sides beside the plurality of battery cell units 21 in the X axis direction. The second restraint band (not shown) is provided at a position facing the plurality of battery cells 11 in the Z axis direction. Each of first restraint bands 43 and the second restraint band extends in the Y axis direction. An end portion of each of first restraint hands 43 and the second restraint band in the −Y axis direction is connected to end plate 42P. An end portion of each of first restraint bands 43 and the second restraint band in the +Y axis direction is connected to end plate 42Q.

Each of first restraint bands 43 is provided with a plurality of openings 44. The plurality of openings 44 are provided at intervals in the Y axis direction. Each of openings 44 is constituted of a through hole extending through first restraint band 43 in the X axis direction. Opening 44 is provided to expose ventilation ports 32 provided in a case body 31 described later.

Battery module 100 further has a pair of collective terminals 91 (91p, 91q) a plurality of voltage detection wires 92, and an exhaust duct 93.

The pair of collective terminals 91 are disposed on both sides beside the plurality of battery cell units 21 stacked in the Y axis direction. Collective terminal 91p is provided at a position overlapping with end plate 42P when viewed in the Z axis direction. Collective terminal 91q is provided at a position overlapping with end plate 42Q when viewed in the Z axis direction. Collective terminals 91 are connected to bus bars 50 described later. Each of collective terminals 91 is a terminal for connecting battery module 100 to a wiring such as a cable disposed outside battery module 100.

Voltage detection wires 92 are provided at positions facing the plurality of battery cell units 21 in the Z axis direction. Voltage detection wires 92 are disposed opposite to the second restraint band (not shown) with the plurality of battery cell units 21 being interposed therebetween. Voltage detection wires 92 extend, in the Y axis direction, through the central portions of battery cell units 21 in the X axis direction. Voltage detection wires 92 are constituted of, for example, a flexible printed circuit board. In the present embodiment, voltage detection wires 92 are arranged above below-described exhaust duct 93.

Each of the plurality of voltage detection wires 92 has a tip portion including a voltage detection terminal 94 extending from voltage detection wire 92, and voltage detection terminal 94 is electrically connected to a selected bus bar 50 described later. The other end of voltage detection terminal 94 is connected to a control unit (not shown) for battery voltage monitoring.

Exhaust duct 93 extends in the Y axis direction. Exhaust duct 93 extends at a position overlapping with each of voltage detection wires 92 when viewed in the Z axis direction. Exhaust duct 93 is disposed between each of the plurality of battery cell units 21 and each of voltage detection wires 92 in the Z axis direction.

As shown in FIGS. 2 and 3, each of battery cell units 21 has a plurality of battery cells 11 and a holding member 30.

Battery cell unit 21 has four battery cells 11 (11a, 11b, 11c, 11d). Battery cell unit 21 has an even number of battery cells 11. It should be noted that the number of battery cells 11 included in each battery cell unit 21 is not particularly limited as long as two or more battery cells 11 are included.

In each battery cell unit 21, i.e., in each of battery cell unit 21A, battery cell unit 21B, battery cell unit 21C, battery cell unit 21D, battery cell unit 21E, and battery cell unit 21F, the plurality of battery cells 11 are arranged side by side continuously in the Y axis direction. Battery cell 11a, battery cell 11b, battery cell 11c, and battery cell 11d are arranged side by side in this order from the negative side to the positive side in the Y axis direction.

The stacking direction of the plurality of battery cells 11 in each battery cell unit 21 is the same as the stacking direction of the plurality of battery cell units 21.

Holding member 30 collectively holds the plurality of battery cells 11 (11a, 11b, 11c, 11d). Holding member 30 includes case body 31. Case body 31 has an external appearance having a rectangular parallelepiped shape. The plurality of battery cells 11 are accommodated in case body 31.

Case body 31 is provided with the plurality of ventilation ports 32. The plurality of ventilation ports 32 are provided in the both side surfaces of case body 31 orthogonal to the X axis direction. Each of ventilation ports 32 is constituted of a through hole extending through case body 31 in the X axis direction. Ventilation port 32 is provided as a path for introducing cooling air into a space between battery cells 11 adjacent to each other in the Y axis direction.

Figure 4:
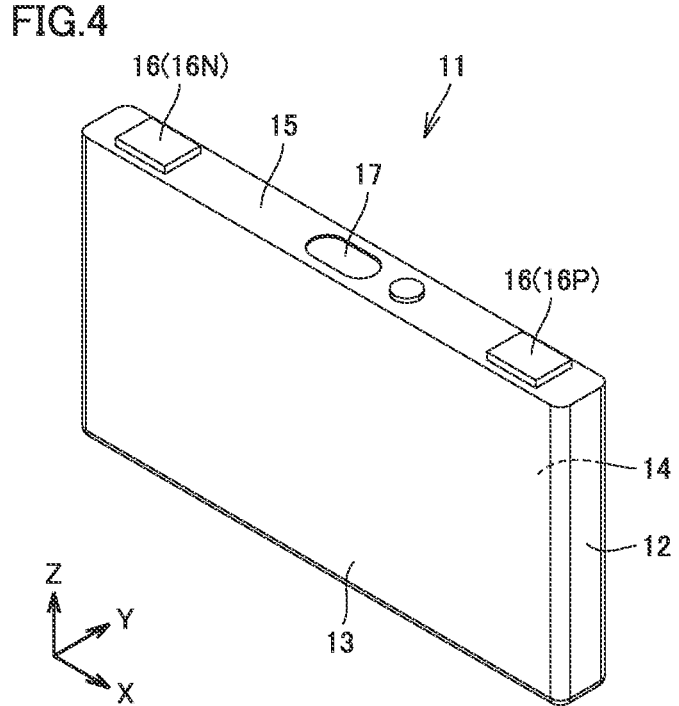
FIG. 4 is a perspective view showing a battery cell included in the battery cell unit in FIG. 3.
Figure 5:
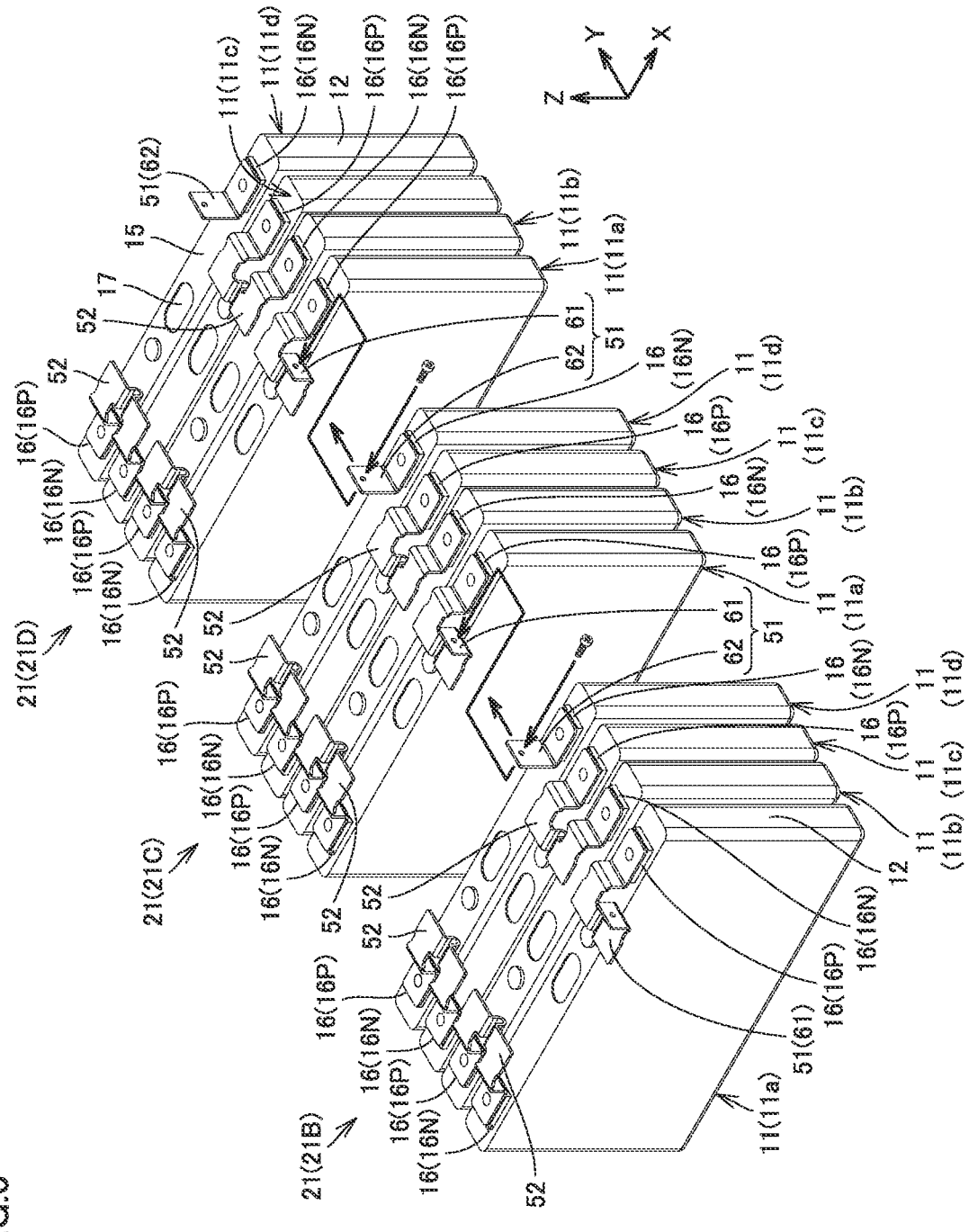
FIG. 5 is an exploded assembly diagram showing a connection structure for a plurality of battery cells according to the first embodiment.

FIG. 4 is a perspective view showing a battery cell 11 included in battery cell unit 21 in FIG. 3. FIG. 5 is an exploded assembly diagram showing a connection structure for a plurality of battery cells 11.

Referring to FIGS. 4 and 5, battery cell 11 is a lithium ion battery. Battery cell 11 has an output density of 8000 W/L or more. Battery cell 11 has a prismatic shape and has a thin plate shape in the form of a rectangular parallelepiped. The plurality of battery cells 11 are stacked such that the Y axis direction corresponds to the thickness direction of each battery cell 11.

Each of battery cells 11 has an exterior package 12. Exterior package 12 is constituted of a housing having a rectangular parallelepiped shape, and forms the external appearance of battery cell 11. An electrode assembly and an electrolyte solution are accommodated in exterior package 12.

Exterior package 12 has a first side surface 13, a second side surface 14, and a third side surface 15. Each of first side surface 13 and second side surface 14 is constituted of a flat surface orthogonal to the Y axis direction. First side surface 13 and second side surface 14 are oriented oppositely in the Y axis direction. Each of first side surface 13 and second side surface 14 has the largest area among the areas of the plurality of side surfaces of exterior package 12. Each of first side surface 13 and second side surface 14 has a rectangular shape when viewed in the Y axis direction. Each of first side surface 13 and second side surface 14 has a rectangular shape in which the X axis direction corresponds to the long-side direction and the Z axis direction corresponds to the short-side direction when viewed in the Y axis direction. Third side surface 15 is constituted of a flat surface orthogonal to the Z axis direction. Third side surface 15 is oriented in the +Z axis direction.

Battery cell 11 further includes a gas-discharge valve 17. Gas-discharge valve 17 is provided in third side surface 15. When internal pressure of exterior package 12 becomes more than or equal to a predetermined value due to gas generated inside exterior package 12, gas-discharge valve 17 discharges the gas to the outside of exterior package 12. The gas from gas-discharge valve 17 flows through exhaust duct 93 in FIG. 1 and is discharged to the outside of battery module 100.

Battery cell 11 further has electrode terminals 16 including a pair of a positive electrode terminal 16P and a negative electrode terminal 16N. Each of electrode terminals 16 is composed of a metal. Electrode terminal 16 is provided on third side surface 15. Positive electrode terminal 16P and negative electrode terminal 16N are provided to be separated from each other in the X axis direction. Positive electrode terminal 16P and negative electrode terminal 16N are provided beside voltage detection wires 92 and exhaust duct 93 in the X axis direction.

The plurality of battery cells 11 are stacked such that first side surfaces 13 of battery cells 11, 11 adjacent to each other in the Y axis direction face each other and second side surfaces 14 of battery cells 11, 11 adjacent to each other in the Y axis direction face each other. Thus, positive electrode terminals 16P and negative electrode terminals 16N are alternately arranged in the Y axis direction in which the plurality of battery cells 11 are stacked.

It should be noted that when an odd number of battery cells 11 are included in battery cell unit 21, the posture of battery cell unit 21 may be turned by 180° with respect to the Z axis between battery cell units 21 adjacent to each other in the Y axis direction.

Next, a connection structure for electrode terminals 16 will be described. Referring to FIGS. 1 to 5, battery module 100 further has the plurality of bus bars 50. Each of bus bars 50 is composed of an electric conductor. The plurality of bus bars 50 are provided to electrically connect the plurality of battery cells 11 of battery module 100 together.

Each of bus bars 50 extends in the Y axis direction. Bus bar 50 has ends that both extend in the Y axis direction and that are connected to battery cells 11, 11 adjacent to each other in the Y axis direction. Bus bar 50 is provided between battery cells 11, 11 adjacent to each other in the Y axis direction so as to connect positive electrode terminal 16P and negative electrode terminal 16Q arranged side by side in the Y axis direction. The plurality of battery cells 11 are electrically connected together in series by the plurality of bus bars 50.

Referring to FIG. 5, the plurality of bus bars 50 include a plurality of first bus bars 51 and a plurality of second bus bars 52. In each of first bus bars 51, a first bus-bar-divided body 61 and a second bus-bar-divided body 62 are joined to each other using joining means such as a bolt or welding.

First bus bar 51 electrically connects between battery cells 11 adjacent to each other in the Y axis direction between a first battery cell unit of the plurality of battery cell units 21 and a second battery cell unit of the plurality of battery cell units 21, the second battery cell unit being adjacent to the first battery cell unit in the Y axis direction. That is, first bus bar 51 electrically connects between outer battery cells 11 of battery cell units 21 adjacent to each other in the stacking direction of battery cell units 21. First bus bars 51 are arranged on one side in the width direction.

For explanation in a range shown in FIG. 5, battery cell unit 21B corresponds to the first battery cell unit, and battery cell unit 21C corresponds to the second battery cell unit. Between battery cell units 21B, 21C, first bus bar 51 connects negative electrode terminal 16N of battery cell 11d in battery cell unit 21B to positive electrode terminal 16P of battery cell 11a in battery cell unit 21C. The same applies to the other battery cell units.

In each battery cell unit 21, second bus bar 52 electrically connects between battery cells 11, 11 adjacent to each other in the Y axis direction. That is, second bus bar 52 electrically connects between battery cells 11 inside battery cell unit 21.

For explanation in the range shown in FIG. 5, second bus bar 52 connects negative electrode terminal 16N of battery cell 11b to positive electrode terminal 16P of battery cell 11c in battery cell unit 218. This second bus bar 52 is located between first bus-bar-divided body 61 and second bus-bar-divided body 62, and is arranged on one side in the width direction. The same applies to the other battery cell units.

Further, other second bus bar 52 connects negative electrode terminal 161 of battery cell 11a to positive electrode terminal 16P of battery cell 11b, and connects negative electrode terminal 16N of battery cell 11c to positive electrode terminal 16P of battery cell 11d. Second bus bars 52 are disposed on the other side in the width direction. The same applies to other battery cell units.

In the present embodiment, it has been illustrated that four battery cells 11 are provided in each battery cell unit 21; however, for example, when two battery cells 11 are provided in one battery cell unit, first bus bar 51 is disposed on one end side in the width direction and second bus bar 52 is disposed on the other end side in the width direction.

Figure 6:
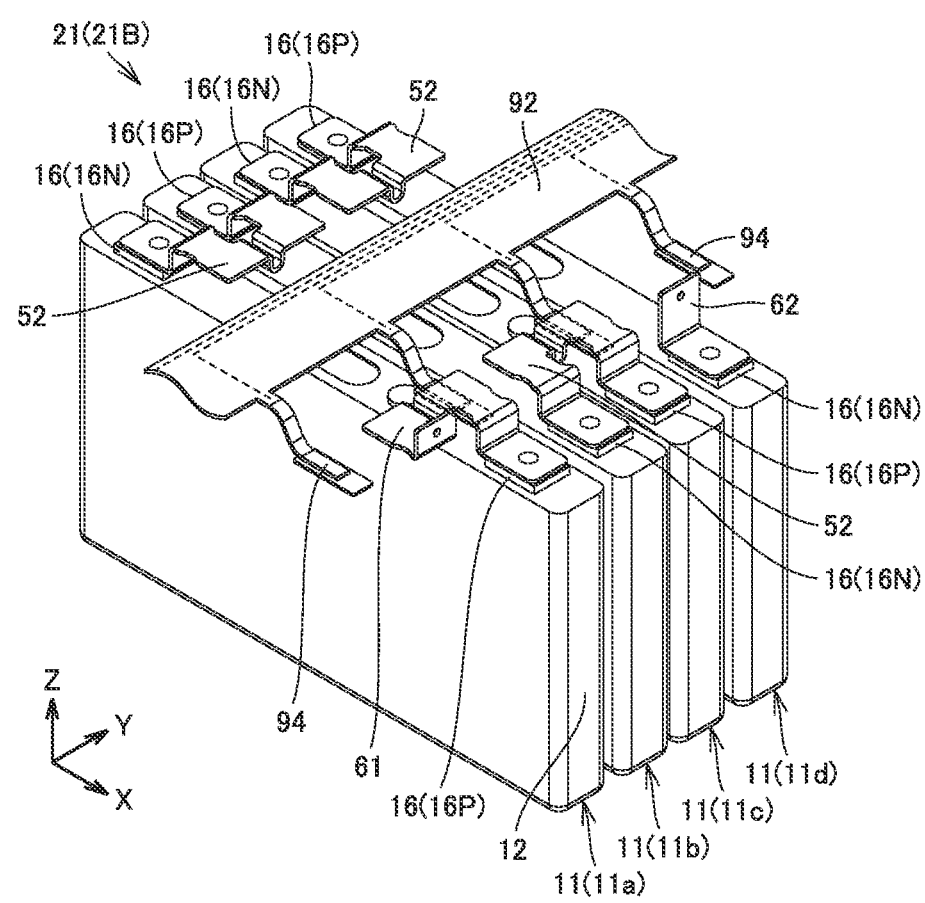
FIG. 6 is a partial enlarged view showing a wiring structure for voltage detection wires according to the first embodiment.

Next, connection of voltage detection wires 92 to battery cells 11 will be described with reference to FIG. 6. FIG. 6 is a partial enlarged view only showing a wiring structure for voltage detection wires in battery cell unit 21B. The same applies to the other battery cell units.

For explanation in the range shown in FIG. 6, in the present embodiment, each voltage detection wire 92 is connected to one set of two or more battery cells 11 electrically connected together. In the present embodiment, two battery cells are handled as one set, and two voltage detection wires 92 are connected to battery cell unit 21B.

Specifically, each voltage detection wire 92 includes voltage detection terminal 94 extending from the tip of voltage detection wire 92, and voltage detection terminal 94 is electrically connected to first bus-bar-divided body 61 connected to positive electrode terminal 16P of battery cell 11a in battery cell unit 21B. Further, voltage detection terminal 94 of other voltage detection wire 92 is electrically connected to second bus bar 52 connected to positive electrode terminal 16P of battery cell 11c in battery cell unit 21B. The same applies to the other battery cell units.

Thus, in the present embodiment, since the battery voltage is detected for every two battery cells 11, voltage detection wires 92 can be drawn only on the same, one end side in the width direction of battery cell 11. As a result, voltage detection wires 92 can be avoided from being densely arranged, thereby attaining a reduced number of electric wires. Further, since each of voltage detection terminals 94 is connected to one side of a corresponding bus bar, the size of the bus bar cart be reduced.

In the present embodiment, it is illustrated in the figures that a strip-shaped flexible printed circuit board in which the plurality of voltage detection wires 92 are bundled is disposed above exhaust duct 93; however, the plurality of voltage detection wires 92 can be installed to be displaced to one side (the side on which first bus bars 51 are located) when viewed from exhaust duct 93.

Figure 7:
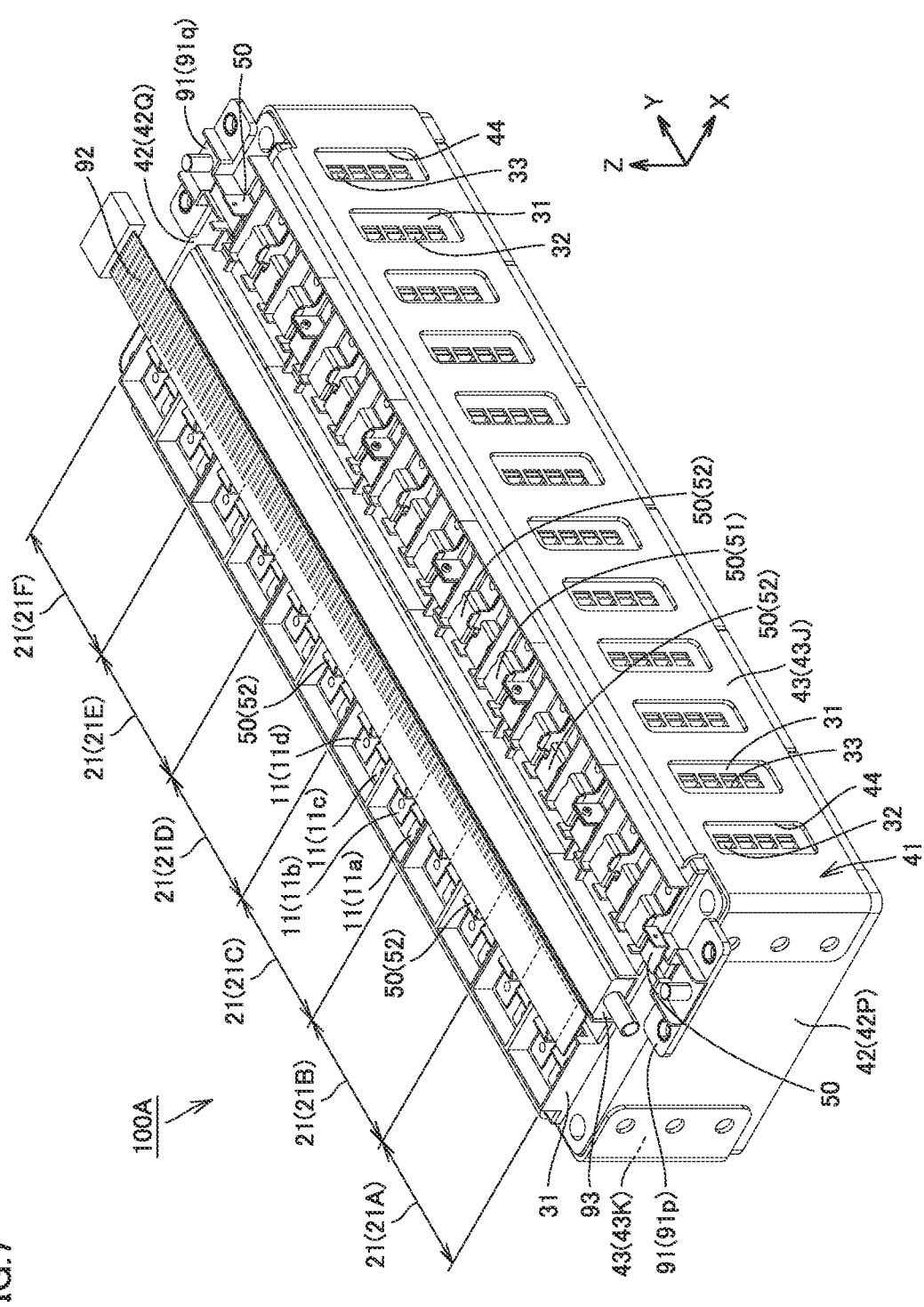
FIG. 7 is a perspective view showing another wiring structure for voltage detection wires according to the first embodiment.

FIG. 7 shows another installation state of voltage detection wires 92. FIG. 7 is a perspective view showing another wiring structure for voltage detection wires. FIG. 7 is a diagram showing a state in which in a battery module 100A, voltage detection wires 92 are installed to be displaced to the other end side (the side on which second bus bars 52 are located) when viewed from exhaust duct 93. When each of voltage detection wires 92 is disposed at such a position, voltage detection terminal 94 of voltage detection wire 92 is connected to second bus bar 52 located on the other end side. This relation of connection will be described below.

OTHER EMBODIMENTS

Connection patterns of voltage detection terminal(s) 94 of voltage detection wire(s) 92 to the bus bar(s) will be described with reference to FIGS. 8 to 11. FIGS. 8 to 11 are schematic views showing first to fourth connection patterns of voltage detection terminal(s) 94 of voltage detection wire(s) 92 to the bus bar(s).

Figure 8:
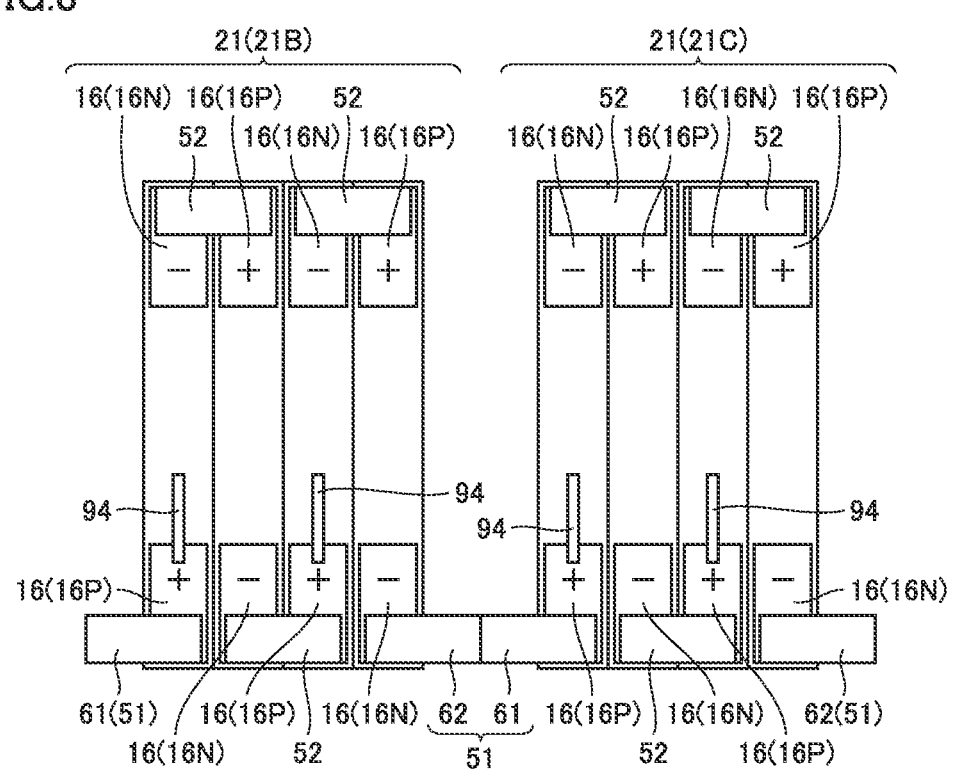
FIG. 8 is a schematic diagram showing a first connection pattern of voltage detection terminals of a voltage detection wire to bus bars according to another embodiment.

The connection pattern of voltage detection terminals 94 of voltage detection wires 92 to the bus bars as shown in FIG. 8 is the connection pattern shown in FIG. 6 in the first embodiment. The voltage detection terminals are disposed on one end side in the width direction of battery cell 11. Specifically, a voltage detection terminal is electrically connected to first bus-bar-divided body 61 connected to positive electrode terminal 16P of battery cell 11a in battery cell unit 21B. Voltage detection terminal 94 of other voltage detection wire 92 is electrically connected to second bus bar 52 connected to positive electrode terminal 16P of battery cell 11c in battery cell unit 21B. The same applies to the other battery cell units.

Figure 9:
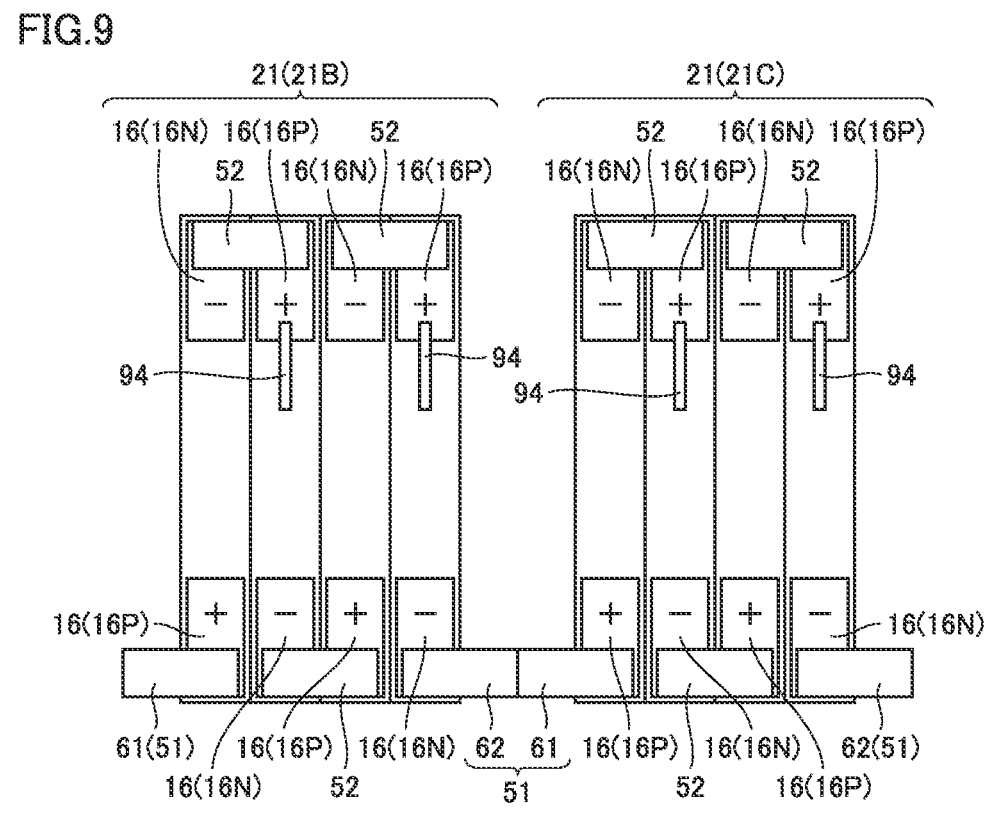

In the connection pattern of voltage detection terminals 94 of voltage detection wires 92 to the bus bars as shown in FIG. 9, the voltage detection terminals are disposed on the other end side in the width direction of battery cell 11. Specifically, a voltage detection terminal is electrically connected to second bus bar 52 connected to positive electrode terminal 16P of battery cell 11b in battery cell unit 21B. Voltage detection terminal 94 of other voltage detection wire 92 is electrically connected to second bus bar 52 connected to positive electrode terminal 16P of battery cell 11d in battery cell unit 21B. The same applies to the other battery cell units. This connection pattern corresponds to the arrangement of voltage detection terminals 94 shown in FIG. 7.

In each of the connection patterns shown in FIGS. 8 and 9, two battery cells 11 are handled as one set; however, four battery cells 11 included in one battery cell unit may be handled as one set.

Figure 10:
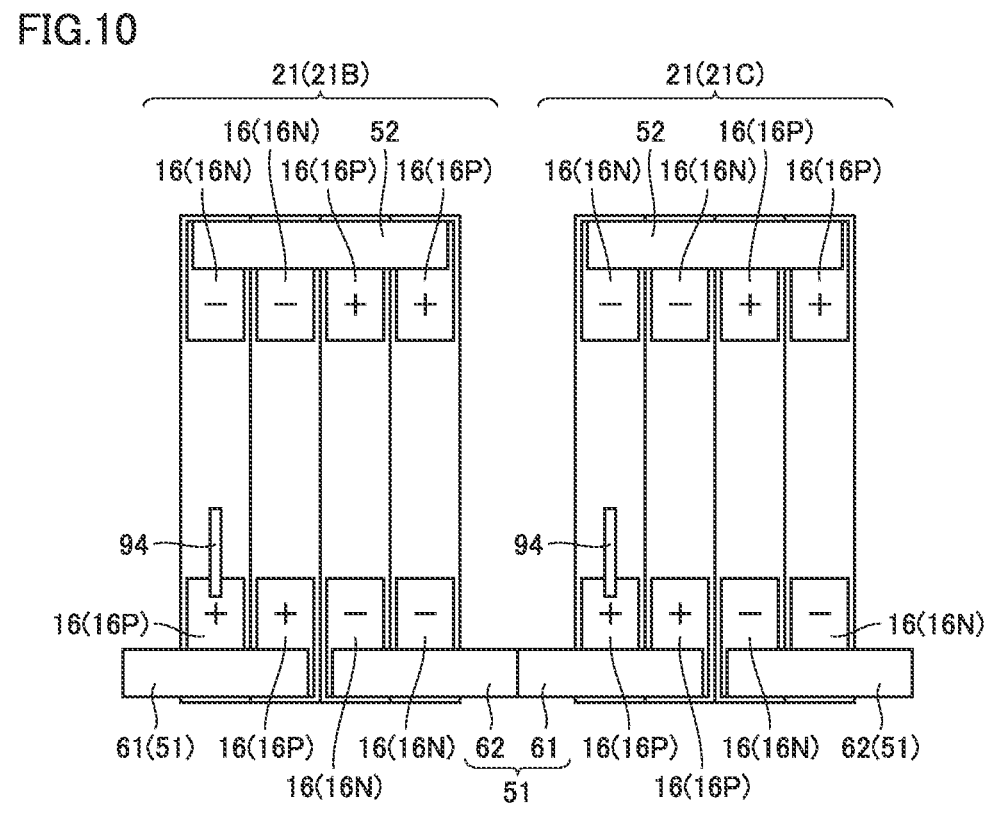

In the connection pattern of voltage detection terminal 94 of voltage detection wire 92 to the bus bar as shown in FIG. 10, the voltage detection terminal is disposed on one end side in the width direction of battery cell 11. Specifically, the voltage detection terminal is electrically connected to first bus-bar-divided body 61 connected to positive electrode terminal 16P of battery cell 11a in battery cell unit 21B. The same applies to the other battery cell units.

Figure 11:
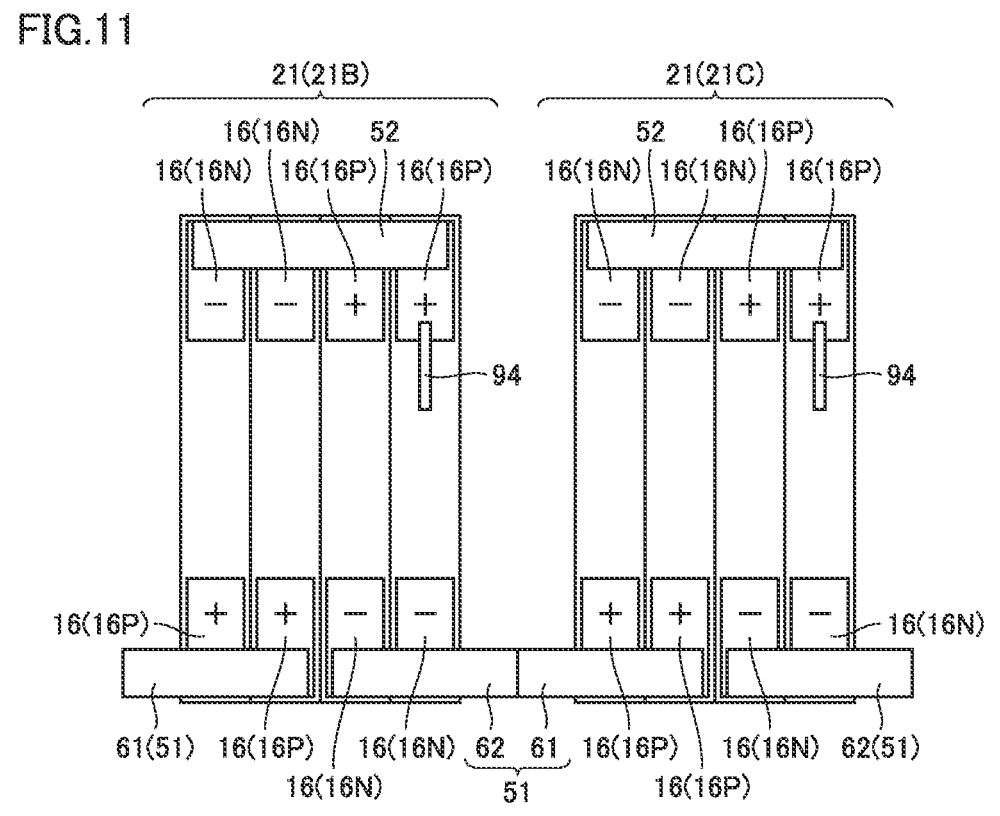

In the connection pattern of voltage detection terminal 94 of voltage detection wire 92 to the bus bar as shown in FIG. 11, the voltage detection terminal is disposed on the other end side in the width direction of battery cell 11. Specifically, the voltage detection terminal is electrically connected to second bus bar 52 connected to positive electrode terminal 16P of battery cell 11b in battery cell unit 21B. The same applies to the other battery cell units.

Since each of the plurality of voltage detection wires is provided to be connected to one set of two or more battery cells electrically connected together as described above, the number of the voltage detection wires can be reduced, thereby attaining reduced sizes of the bus bars, productivity improved by improved workability, and reduced cost.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A battery module comprising:
   a plurality of battery cells stacked in a predetermined stacking direction and electrically connected together;
   a plurality of bus bars that electrically connect the plurality of battery cells together; and
   a plurality of voltage detection wires each connected to one set of two or more battery cells electrically connected together, wherein
   the plurality of battery cells each have a prismatic shape with a long-side direction of each of the battery cells arranged in a direction intersecting the stacking direction of the plurality of battery cells,
   each of the plurality of battery cells includes a positive electrode terminal disposed at one end portion of each of the battery cells in the long-side direction of each of the battery cells and a negative electrode terminal disposed at an opposite end portion of each of the battery cells in the long-side direction of each of the batter cells, and
   the plurality of voltage detection wires are arranged to pass through central portions of the battery cells in the long-side direction of each of the battery cells, midway between the positive electrode terminal and the negative electrode terminal of each of the battery cells, wherein the stacking direction of the battery cells of the battery module is defined as a long-side direction of the battery module and a short-side direction of the battery module with respect to the long-side direction of the battery module is defined as a width direction of the battery module, and all of the voltage detection wires are connected to the battery cells on the same, one side in the width direction of the battery module.

2. The battery module according to claim 1, wherein a plurality of battery cell units in each of which the set of two or more battery cells is accommodated in one holding member are stacked, the plurality of bus bars includes a first bus bar that electrically connects between outer battery cells of battery cell units adjacent to each other in a stacking direction of the battery cell units, the first bus bar being disposed on one side in a width direction of the battery module, and a second bus bar that electrically connects between battery cells inside each battery cell unit, the second bus bar being disposed on the other side in the width direction, and each of the voltage detection wires is connected to the battery cells on the first bus bar side.

3. The battery module according to claim 1, wherein the plurality of battery cells are all disposed in series.

4. The battery module according to claim 1, wherein each of the battery cells is a lithium ion battery.

5. The battery module according to claim 1, wherein each of the battery cells has an output density of 8000 W/L or more.

* * * * *